(12) United States Patent
Pan et al.

(10) Patent No.: US 12,151,320 B2
(45) Date of Patent: Nov. 26, 2024

(54) WELDING SYSTEM OF MODULAR TYPE

(71) Applicants: SHENZHEN JASIC TECHNOLOGY CO., LTD., Guangdong (CN); JASIC TECHNOLOGY EUROPE S.R.L., Milan (IT)

(72) Inventors: Lei Pan, Guangdong (CN); Maurizio Terzo, Costabissara (IT); Enrico Cortelazzo, Padua (IT)

(73) Assignees: SHENZHEN JASIC TECHNOLOGY CO., LTD., Guangdong (CN); JASIC TECHNOLOGY EUROPE S.R.L., Milan (IT)

( * ) Notice: Subject to any disclaimer, the term of this patent is extended or adjusted under 35 U.S.C. 154(b) by 779 days.

(21) Appl. No.: 17/416,295

(22) PCT Filed: Dec. 20, 2019

(86) PCT No.: PCT/IB2019/061168
§ 371 (c)(1),
(2) Date: Jun. 18, 2021

(87) PCT Pub. No.: WO2020/128989
PCT Pub. Date: Jun. 25, 2020

(65) Prior Publication Data
US 2022/0395922 A1  Dec. 15, 2022

(30) Foreign Application Priority Data
Dec. 20, 2018 (IT) .......... 102018000020563

(51) Int. Cl.
*B23K 9/10* (2006.01)
(52) U.S. Cl.
CPC .................. *B23K 9/1068* (2013.01)
(58) Field of Classification Search
CPC .................................. B23K 9/1068
See application file for complete search history.

(56) References Cited

U.S. PATENT DOCUMENTS

| 5,189,277 A | * | 2/1993 | Boisvert | B23K 10/006 |
| | | | | 219/121.48 |
| 2004/0026391 A1 | * | 2/2004 | Oberzaucher | B23K 9/0953 |
| | | | | 219/130.1 |

(Continued)

FOREIGN PATENT DOCUMENTS

| CN | 102725092 A | 10/2012 |
| CN | 106132616 A | 11/2016 |

(Continued)

*Primary Examiner* — Nathaniel E Wiehe
*Assistant Examiner* — Keith Brian Assante
(74) *Attorney, Agent, or Firm* — Robert L. Stearns; Dickinson Wright PLLC

(57) ABSTRACT

The present application relates to a welding system comprising a main module provided with an outer casing identifying an input port for the connection to a source of external electrical power, an electric generator configured to adapt the electrical characteristics of said electrical power to a first type of welding, at least an output port for the connection to a welding torch, an electronic control unit configured to control the functionality of said electric generator. Said main module comprises a mechanical and electrical connection unit of a first type, said welding system comprising at least an auxiliary module provided with an outer casing identifying an electric generator configured to adapt the electrical characteristics of an electrical power to a second type of welding, at least a mechanical and electrical connection unit of a second type couplable to said mechanical and electrical connection unit of a first type.

4 Claims, 20 Drawing Sheets

(56) References Cited

U.S. PATENT DOCUMENTS

| | | | |
|---|---|---|---|
| 2014/0021179 A1* | 1/2014 | Schartner | B23K 9/1075 |
| | | | 219/130.1 |
| 2014/0069906 A1* | 3/2014 | Dessart | B23K 9/323 |
| | | | 219/136 |
| 2016/0098051 A1 | 4/2016 | Enyedy et al. | |

FOREIGN PATENT DOCUMENTS

| | | |
|---|---|---|
| CN | 106132619 A | 11/2016 |
| CN | 106392253 A | 2/2017 |
| DE | 29819251 U1 | 3/2000 |
| WO | 20120155160 A1 | 11/2012 |
| WO | 20180010796 A1 | 1/2018 |

* cited by examiner

WELDING SYSTEM OF MODULAR TYPE

CROSS REFERENCE TO RELATED APPLICATIONS

This application claims priority of Italian Patent Application No. 102018000020563 filed on Dec. 20, 2018, and is a National Stage of PCT Application No. PCT/IB2019/061168 filed on Dec. 20, 2019, the contents of which are incorporated herein by reference thereto.

TECHNICAL FIELD

The application relates to a welding system of the modular type capable of being adapted for executing different and multiple types of welding.

The expression "welding procedure" is known to mean a technique, which allows the physical/chemical fusion of two joints.

BACKGROUND

Welding processes constitute a relatively wide and varied sector, which has adapted over time to the development of materials and of production technologies. At a macroscopic level, it can be said that the processes, which have mainly been developed in the field of industry, belong to the group of welding by melting metal materials.

Such processes use heat, generated in various ways, for melting the base material, which may belong to the joints themselves or which may be a filler metal.

The processes most commonly used in the field of welding by melting metals include electric-arc weldings, which comprise, in particular, coated electrode manual weldings, defined by the acronym MMA, with submerged arc (SAW), with continuous wire with shielding by gas (MIG/MAG) and with shielding by gas with non-consumable electrode (defined with the acronym TIG).

There is also a second macro-category of weldings by melting, which comprises concentrated energy weldings, i.e. all those welding processes, which use beams of energy, which succeed in concentrating highly elevated powers on the piece, varying from some thousands to various millions of watts per square millimetre of surface area. In particular, Laser weldings (LBW), with electric beam (EBW) and plasma (PAW) are part of such last category.

It is also known that in order to execute each of the aforesaid different types of welding, the use of a specific welding device is required, comprising an electric power generator configured specifically to adapt the output power so as to exclusively execute the aforesaid specific type of welding or, at most, a limited number of such types.

Thus, disadvantageously, in order to be able to execute the different types of welding, it is necessary to have a multiplicity of welding devices, each specifically configured to implement one of the aforesaid types of welding.

Disadvantageously, this results in an elevated cost for the purchase or hire of the individual welding devices for executing the various welding techniques.

Furthermore, the costs of maintenance and/or repairs for each single welding device of the prior art should not be underestimated, costs, which must be multiplied by the number of devices available.

Furthermore, disadvantageously, the need to have a wide range of devices for implementing the various welding techniques could result in the coexistence of devices from various manufacturers and thus with different settings and operating modes, which could determine increased difficulty for operators in setting and implementing the various welding operations, consequently prolonging machining times and increasing the risks of error.

As mentioned previously, welding devices also exist, which are configured to execute several types of the aforesaid weldings.

However, at first, it may not be necessary to purchase and have devices capable of executing different types of welding, but subsequently, such need may arise.

Consequently, many companies, discouraged by the elevated cost of the aforesaid multifunction devices, of which they would basically only use a minimum percentage of the functionalities available, prefer to purchase the aforesaid devices with the specific individual welding functionality.

SUMMARY

The present application aims to overcome the drawbacks of the prior art highlighted thus far.

In particular, it is a first object of the present application to produce a welding system of the modular type capable of being adapted to implement a specific welding process selected from those indicated above.

In particular, it is an object of the application to produce a welding system of the modular type, which can be adapted to a specific welding process in a quick and reversible manner, without needing to intervene internally on the components of the system and on the wiring, connecting such components.

Another object of the application is to produce a modular welding system, which can quickly be adapted to a specific welding process and, at the same time, which is cheaper than purchasing or hiring multiple welding devices of the prior art, each exclusively adapted to execute a specific type of welding.

In particular, it is an object of the present application to produce a welding system, which subsequently allows the integration, at a reduced cost, of a further type of welding with respect to those already available.

The listed objects are achieved by the modular welding system according to the principal claim.

Further features of the application are described in the dependent claims.

Advantageously, the welding system of the application facilitates and accelerates the setting operations, which an operator must carry out in order to be able to implement a particular type of welding.

BRIEF DESCRIPTION OF THE DRAWINGS

The listed objects and advantages will be evidenced better below during the description of some preferred, but not exclusive embodiments of the application, which are given here below, purely by way of a non-limiting example, with reference to the accompanying drawing tables, wherein.

DETAILED DESCRIPTION

The welding system of the modular type of the application is represented as a whole, according to a first preferred embodiment, in FIGS. from 1 to 4, where it is globally denoted with 1, and according to a second preferred embodiment, in FIGS. from 5 to 8, where it is denoted with 100.

Figure 1:
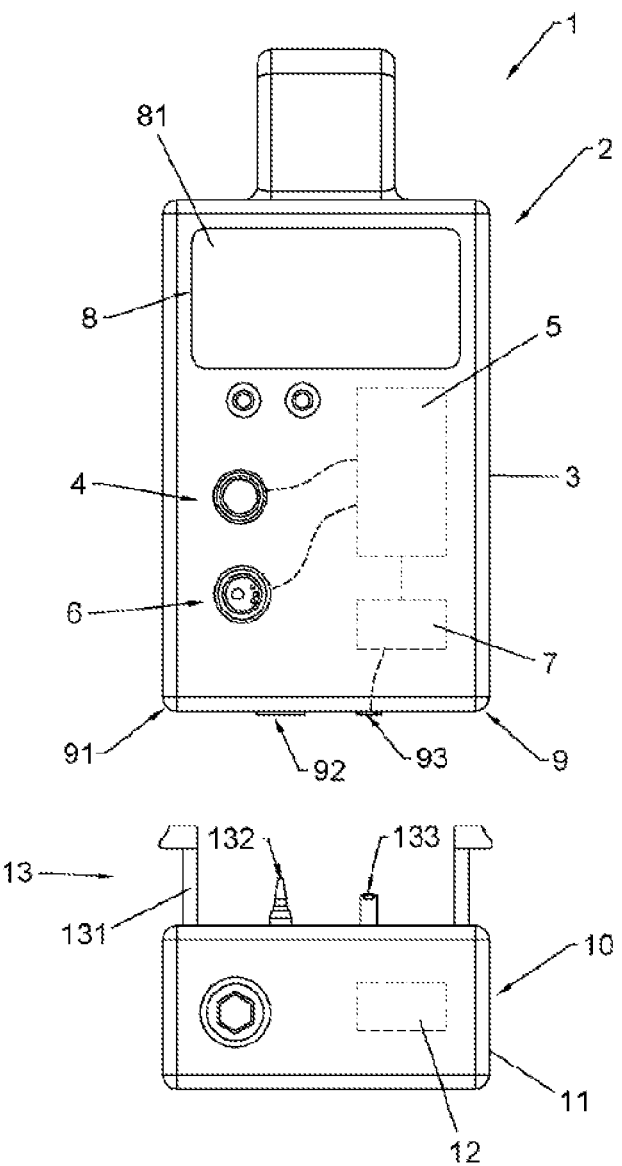
FIG. 1 shows a front view of a first preferred embodiment of the welding system in a non-coupling configuration.
Figure 2A:
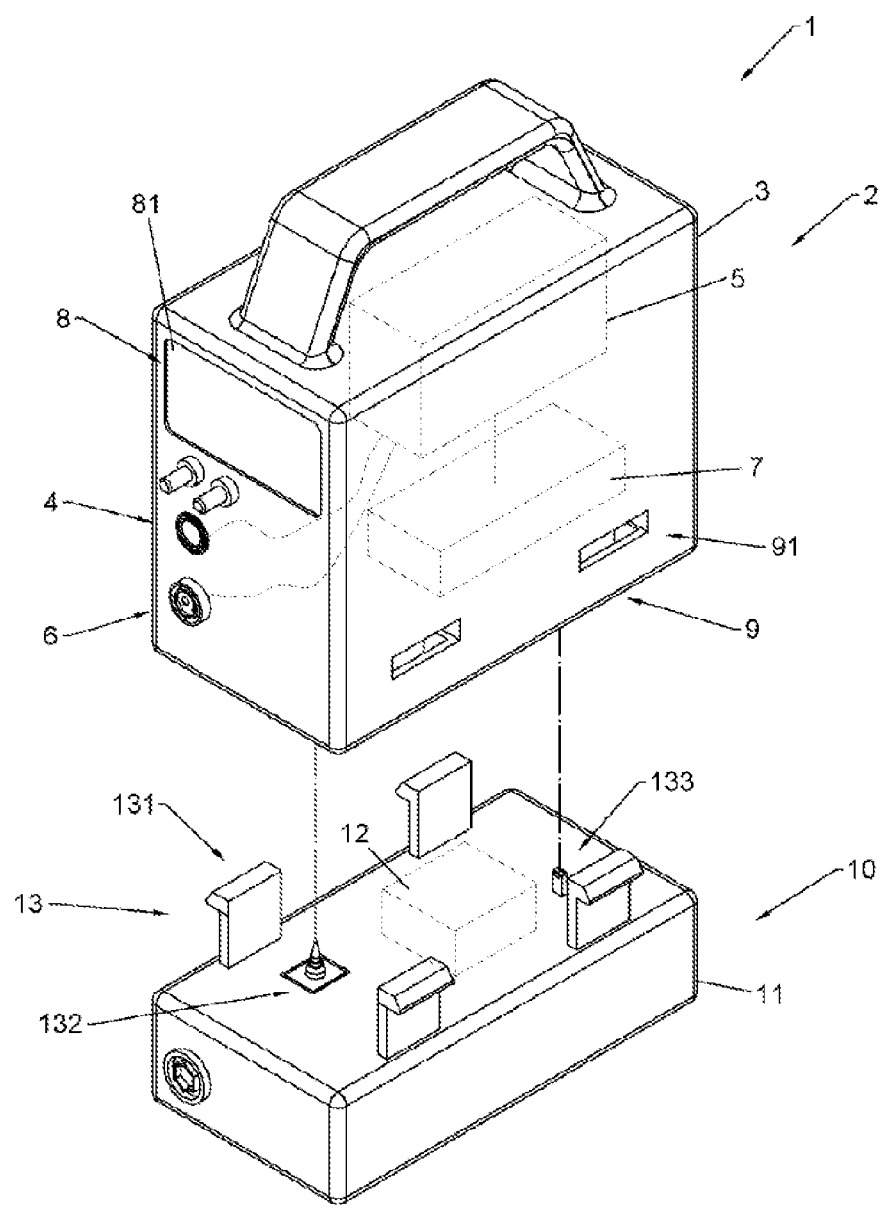
FIGS. 2A and 2B show two axonometric views of the first preferred embodiment of the welding system in FIG. 1 in a non-coupling configuration.
Figure 2B:
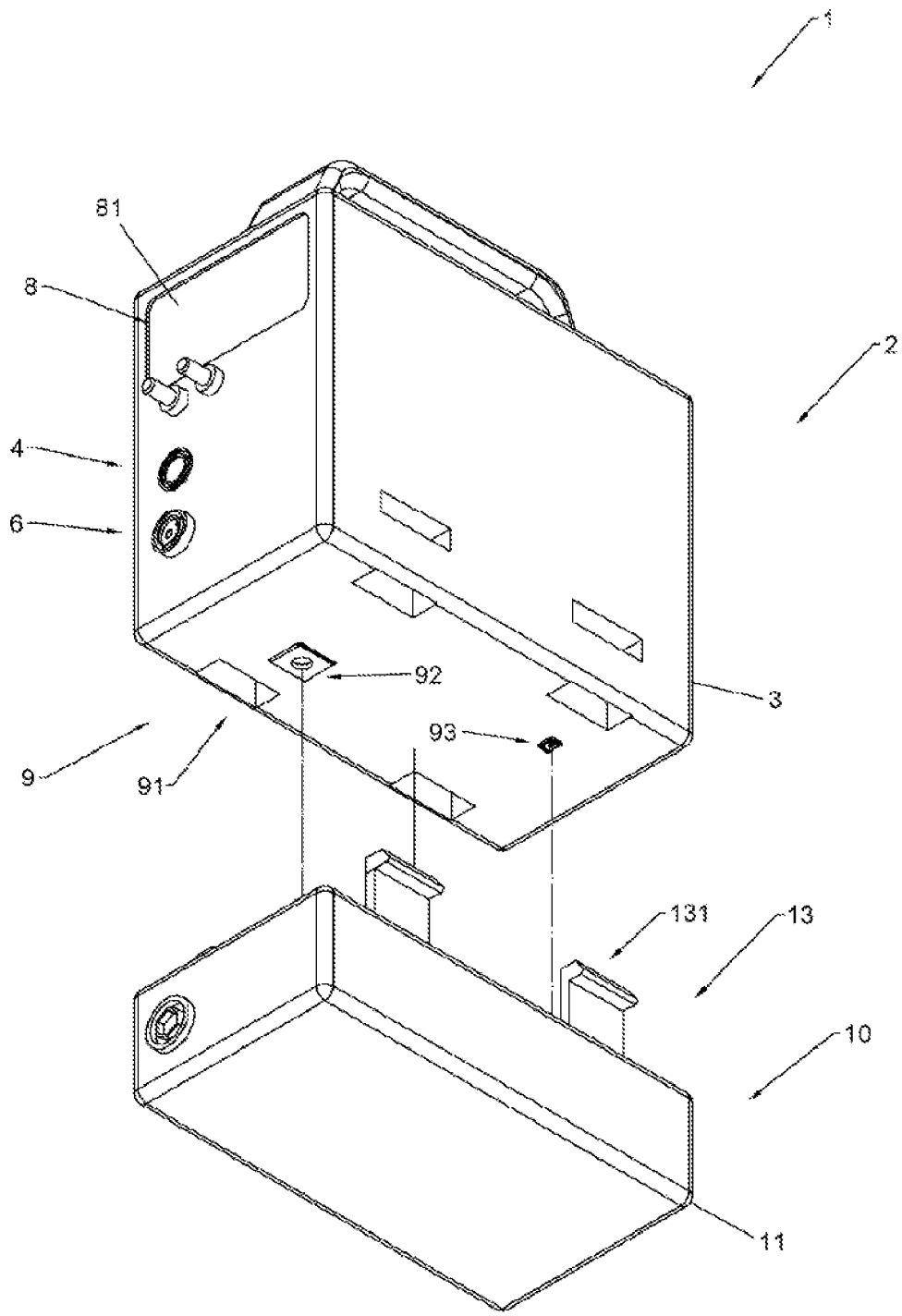

As regards the first embodiment of the application, the welding system 1, as seen in FIGS. 1, 2A and 2B, comprises a main module 2 provided with an outer casing 3 identifying an input port 4 for the connection to a source of external electrical power, an electric generator 5, preferably an inverter device, configured to adapt, to at least a first type of welding, the electrical characteristics of the aforesaid electrical power received on input, and an output port 6 for the connection, by means of an electrical conductor, to a welding torch. The aforesaid electrical power adapted by the electric generator 5 is provided on such output port 6.

Furthermore, such main module 2 comprises an electronic control unit 7 configured to control the functionality of the aforesaid electric generator 5.

Preferably, such electric generator 5 is configured, according to the first preferred embodiment, to adapt the electrical power received on input to the execution, alternatively, of the weldings of the manual type with coated electrode (MMA), with continuous wire and shielding by gas (MIG/MAG) or shielding by gas and with non-consumable electrode (TIG). To allow the operator to select, and thus implement one of the aforesaid types of welding, the main module 2 comprises a control panel 8, preferably a touch screen display 81, by means of which it is opportunely possible to set the software loaded on the aforesaid electronic control unit 7.

However, it is not excluded that according to alternative embodiments of the application, such main module 2 and the relative electric generator 5 are configured to execute only one type of welding or, differently, they are configured to allow the execution of welding processes different from those stated above.

According to the application, the main module 2 comprises, on such outer casing 3, a mechanical and electrical connection unit of a first type 9, defined more specifically below and the function of which will be clarified below.

Furthermore, according to the application, the welding system 1 comprises an auxiliary module 10 provided, in turn, with an outer casing 11 identifying an electric generator 12 configured to adapt the electrical characteristics of an electrical power received on input to a different type of welding from those implementable with the main module 2. According to the preferred embodiment of the application, the type of welding implementable with the aforesaid second module 10 corresponds to plasma welding. However, it is not excluded that such auxiliary module 10, in an alternative embodiment of the application with respect to the preferred one described herein, can be configured to execute a different welding from plasma welding, such as, for example, the type of welding CMT (Cold Metal Transfer), Tig in pulsed mode, Laser, with electric beam or further different types of welding or a combination thereof.

Figure 3:
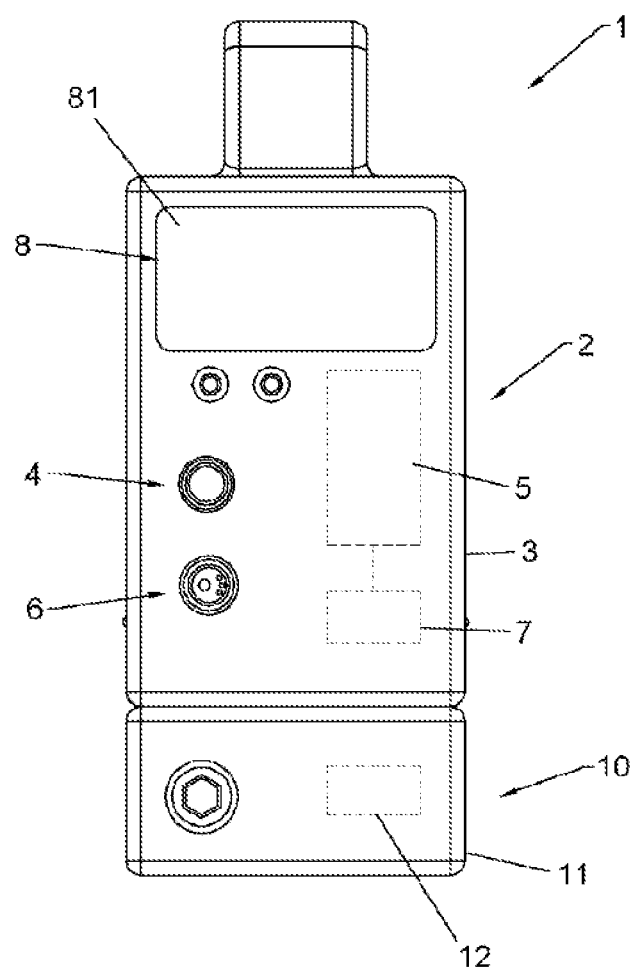
FIG. 3 shows a front view of the first preferred embodiment of the welding system in FIG. 1 in a coupling configuration.
Figure 4:
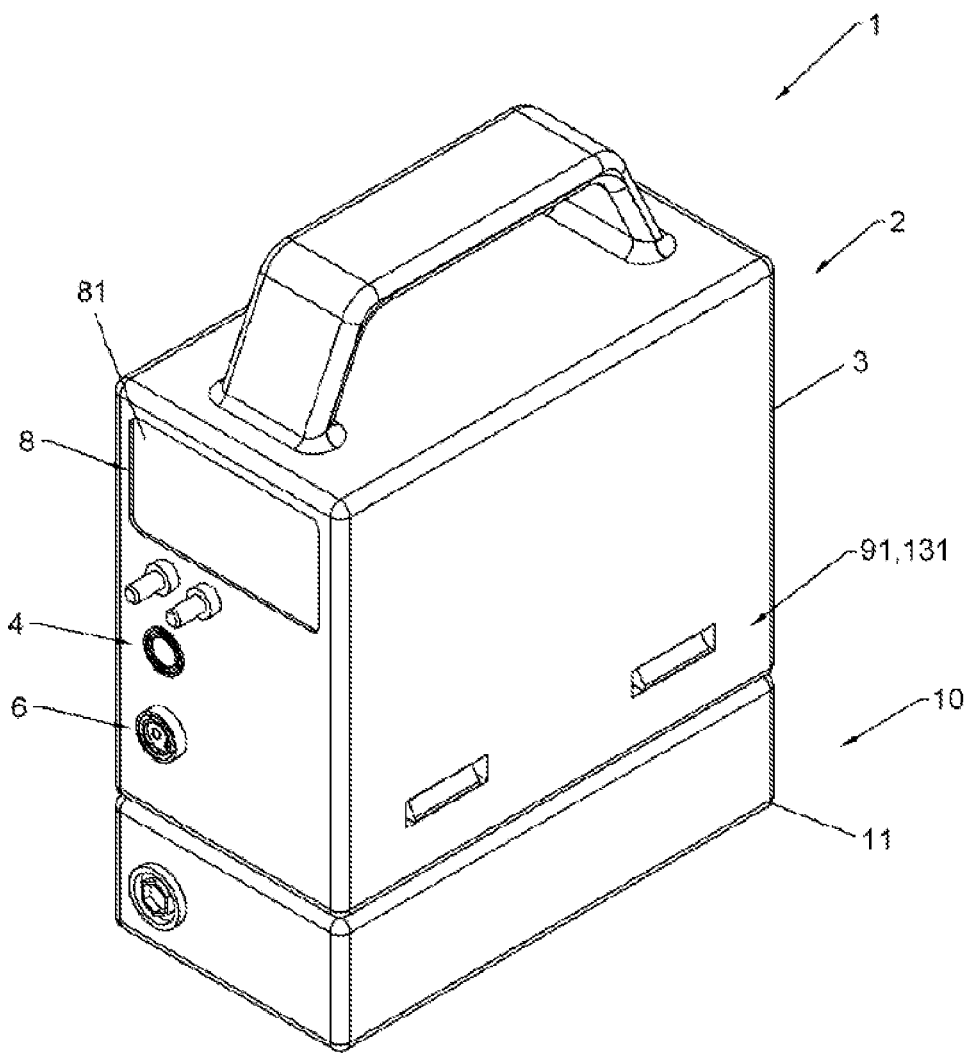
FIG. 4 shows an axonometric view of the first preferred embodiment of the welding system in FIG. 1 in a coupling configuration.
Figure 5:
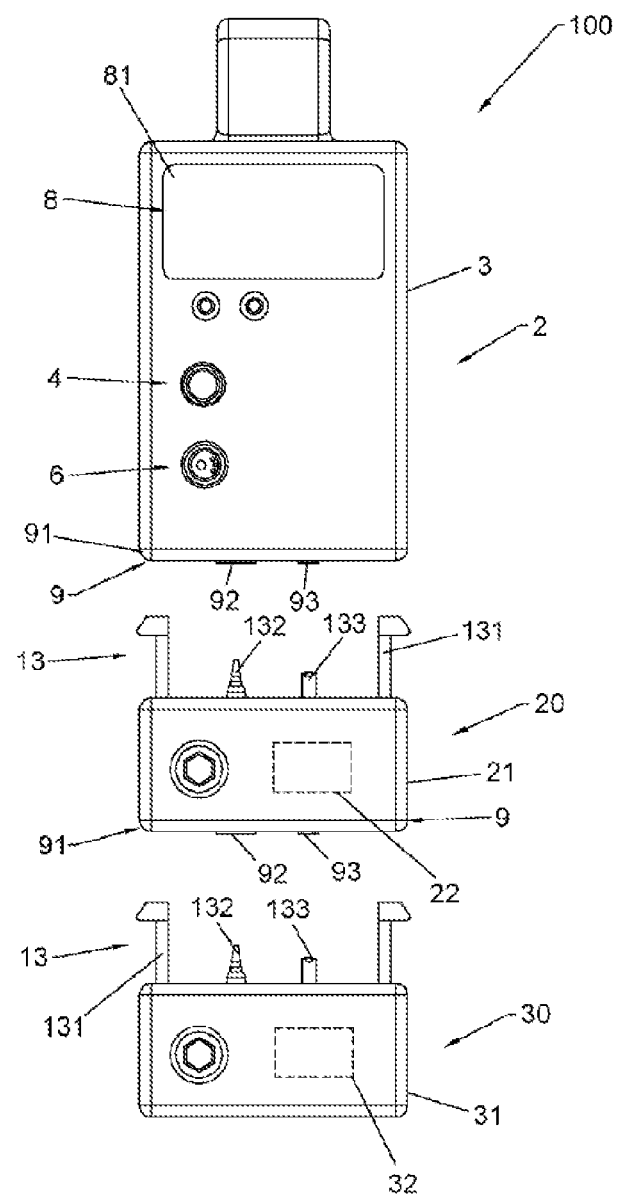
FIG. 5 shows a front view of a second preferred embodiment of the welding system in a non-coupling configuration.
Figure 6:
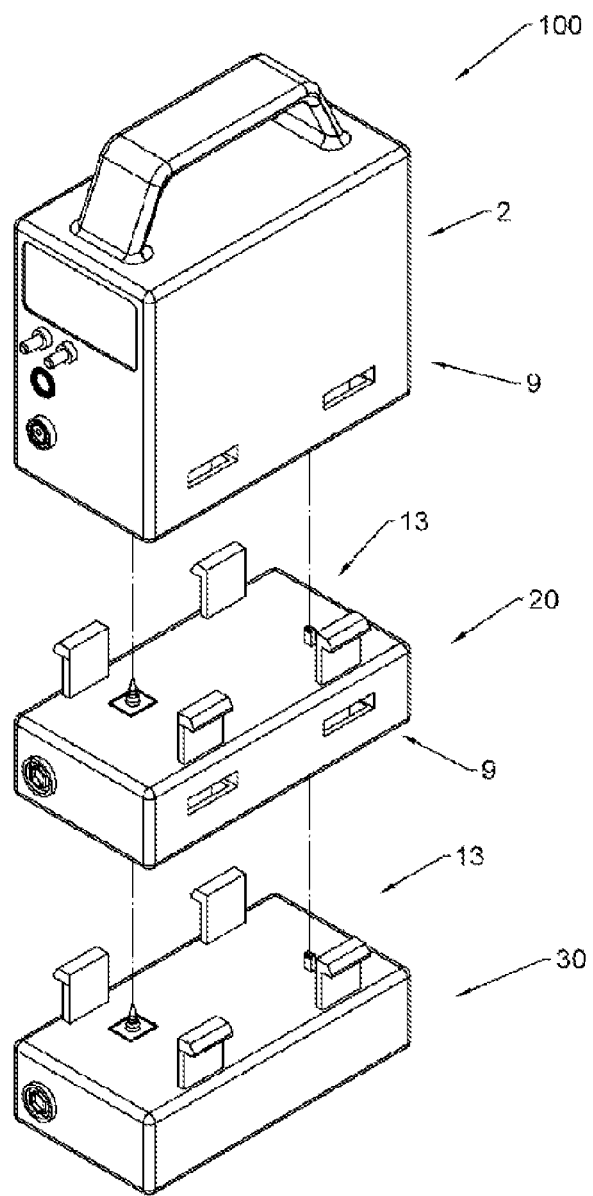
FIG. 6 shows an axonometric view of the second preferred embodiment of the welding system in FIG. 5 in a non-coupling configuration.

Going back to the auxiliary module 10, according to the preferred embodiment of the application, in turn, it comprises a mechanical and electrical connection unit of a second type 13, configured to be coupled to the mechanical and electrical connection unit of the aforesaid first type 9 belonging to the main module 2. Such mechanical and electrical connection unit of the first type 9 and the corresponding mechanical and electrical connection unit of the second type 13 are configured, in particular, to allow the main module 2 to be coupled mechanically and in a reversible manner to the auxiliary module 10, as can be seen in FIGS. 3 and 4. Furthermore, the coupling of the aforesaid mechanical and electrical connection units of the first type and second type 9 and 13 allow an electrical power connection and a data connection to be established between the main module 2 and the auxiliary module 10.

In particular, such electrical power connection is configured to allow the flow of an electrical power from the main module 2 to the auxiliary module 10, so that the power from the aforesaid main module 2 can be adapted by the electric generator 12 of the auxiliary module 10 for a specific type of welding, which cannot be implemented only by means of the main module 2.

Even more specifically, according to the aforesaid first preferred embodiment of the application, when the main module 2 is mechanically and electrically coupled to the auxiliary module 10, the electrical power transmitted to the latter by means of the electrical power connection corresponds to the power received, on input, on the input port 4 of the same main module 2.

However, it is not excluded that, according to a different alternative embodiment of the application, when the main module 2 is mechanically and electrically coupled to the auxiliary module 10, the electrical power transmitted to the latter by means of the electrical power connection, corresponds to the power already adapted by the electric generator 5 of the main module 2, so as to further adapt it to execute the specific type of welding for which the auxiliary module 10 is configured.

According to the first preferred embodiment of the application, when the main module 2 is mechanically and electrically coupled to the auxiliary module 10, the welding system 1 is also configured to transmit, by means of the aforesaid electrical power connection, the electrical power adapted by the electric generator 12 of the auxiliary module 10 to the output port 6 of the main module 2.

Advantageously, in this way, for any type of welding, it is possible to take advantage of the output 6 defined in the main module 2 to connect and use the torch specifically adapted to execute the type of welding for which the auxiliary module 10 is configured, thus, without also having to provide the auxiliary module 10 with a further output port. However, it is not excluded that, according to a different embodiment of the welding system 1 of the application, alternatively or in addition to the transmission of the electrical power adapted by the auxiliary module 10 to the main module 2, the auxiliary module 10, in turn, comprises an output port for the connection, by means of an electrical conductor, of the specific welding torch, adapted to execute the type of welding for which the auxiliary module 10 is configured.

In other words, the aforesaid electrical power adapted by the electric generator 12 is provided on the aforesaid output port of the auxiliary module 10.

According to the aforesaid first preferred embodiment of the application, as according to the alternative embodiments described above, when the main module 2 is mechanically and electrically coupled to the auxiliary module 10, the electronic control unit 7 of the main module 2 is configured to control the functionality of the electric generator 12 of the auxiliary module 10 by means of the aforesaid data connection.

Thus, advantageously, the welding system 1 of the application comprises exploiting a single electronic control unit 7, for controlling both the electric generator 5 of the same main module 2, and the electric generator 12 of the auxiliary module 10.

In particular, as regards the mechanical and electrical connection unit of the first type 9, according to the application, it has first mechanical connection means 91, first electrical power connection means 92 and first data connection means 93, while, as regards the mechanical and electrical connection unit of the second type 13, it comprises second mechanical connection means 131 couplable to the aforesaid first mechanical connection means 91, second electrical power connection means 132 couplable to the first electrical power connection means 92 and second data connection means 133 couplable to the first data connection means 93.

In particular, the first and second electrical power connection means 92 and 132 and the first and second data connection means 93 and 133 are coupled to each other respectively when the auxiliary module 10 is mechanically coupled to the main module 2 by means of the first mechanical connection means 91 and the second mechanical connection means 131.

As regards the first mechanical connection means 91 and the second mechanical connection means 131, preferably, but not necessarily, they are quick-coupling joints.

As regards the first data connection means 93 and the second data connection means 133, preferably, but not necessarily, they are connectors of the RJ45 type. It is not excluded that, according to alternative embodiments, these can be selected from other types of data connectors, such as, for example, USB, serial, infrared connectors, provided they are of the quick-coupling and reversible type.

Figure 13:
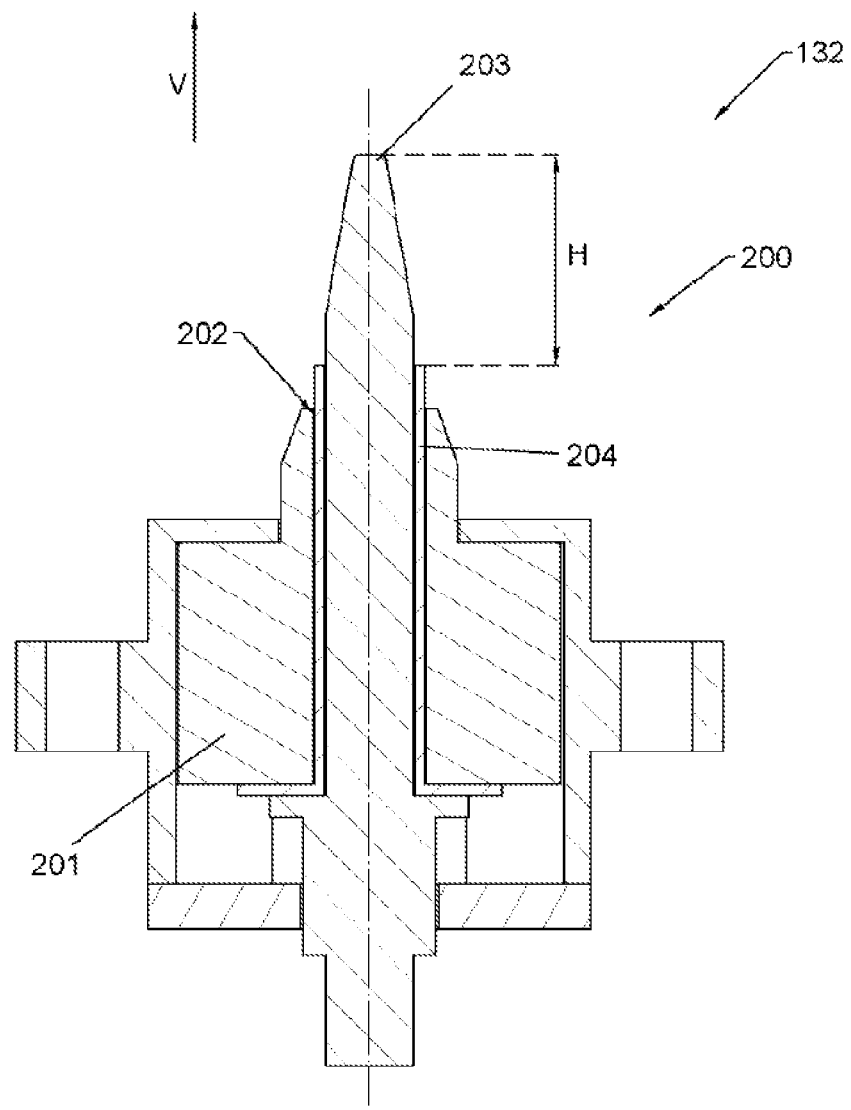
FIG. 13 shows a sectional view of a male connector according to a first embodiment of the application.
Figure 14:
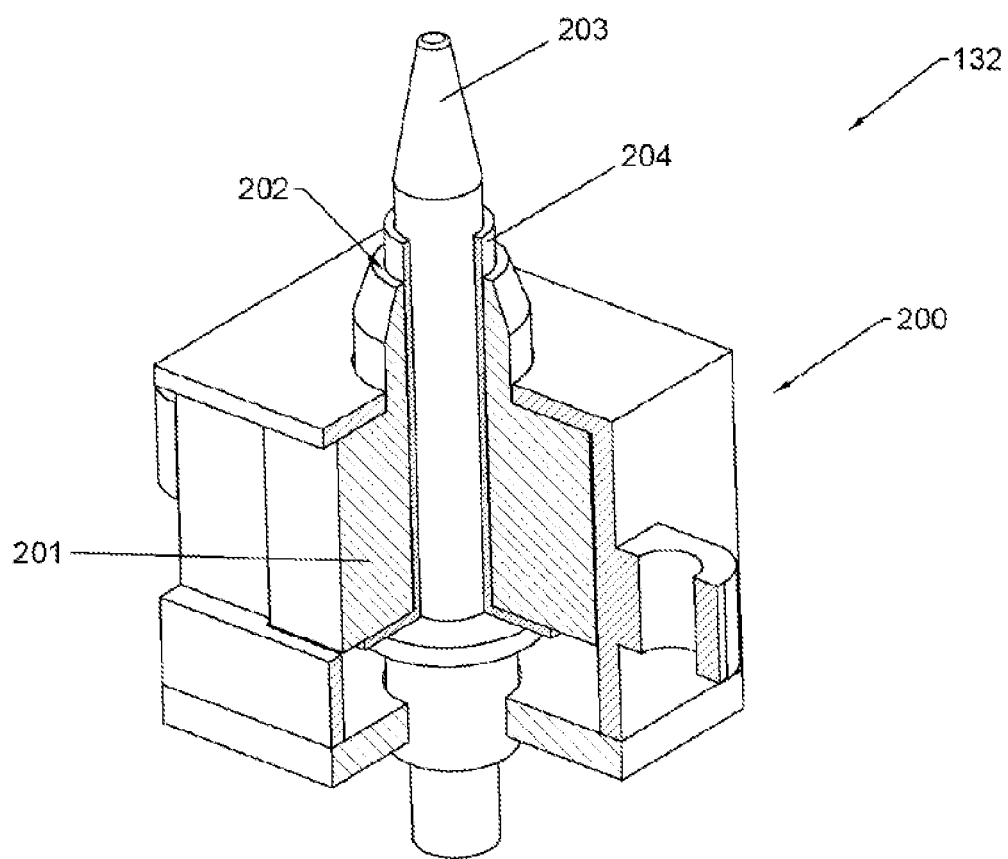
FIG. 14 shows a split axonometric view of the male connector in FIG. 13.

Finally, as regards the second electrical power connection means 132, as can be seen in FIG. 13 and in FIG. 14, according to the first preferred embodiment of the application, they comprise a male connector 200 provided with a first conductor element 201, in which a through hole 202 is made according to the V direction exiting the casing 3 of the relative module 2 and a second conductor element 203 with a substantially longitudinal development, which is inserted passing through the aforesaid through hole 202.

The second conductor element 203 has the free end thereof 203a protruding outwards with respect to the through hole 202 for a predetermined height H.

Furthermore, the male connector 200 comprises an electrically isolating tubular element 204 arranged between said first conductor element 201 and said second conductor element 203, so that the first conductor element 201 and the second conductor element 203 are electrically isolated from each other.

Figure 17:
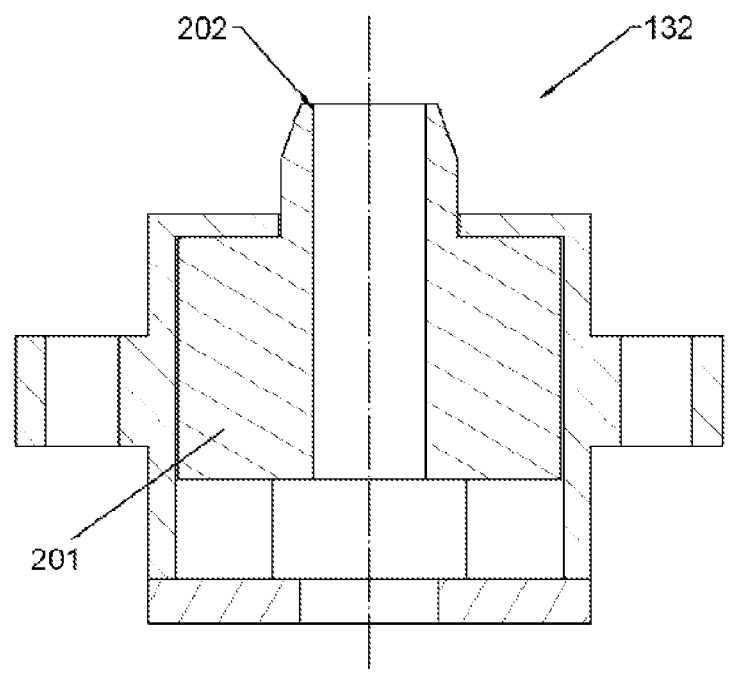
FIG. 17 shows a sectional view of a male connector according to an alternative embodiment of the application with respect to the embodiment in FIGS. 13 and 14.
Figure 18:
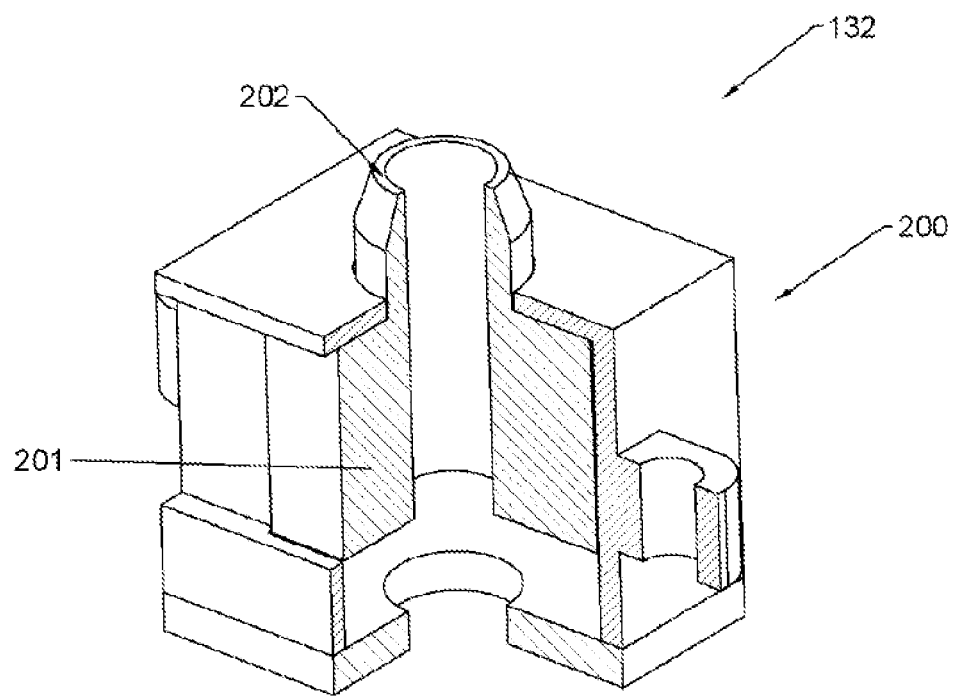
FIG. 18 shows a split axonometric view of the male connector in FIG. 17.

In an alternative embodiment, as shown in FIGS. 17 and 18, such male connector 200 could comprise all of the characteristics described above apart from being devoid of the second conductor element 203.

As will be described specifically below, such difference between the two versions of the male connector 200 allows two different functionalities to be obtained when such male connectors are alternately coupled to the female connector 300 belonging to the first electric power connection means 92 described below.

Figure 9:
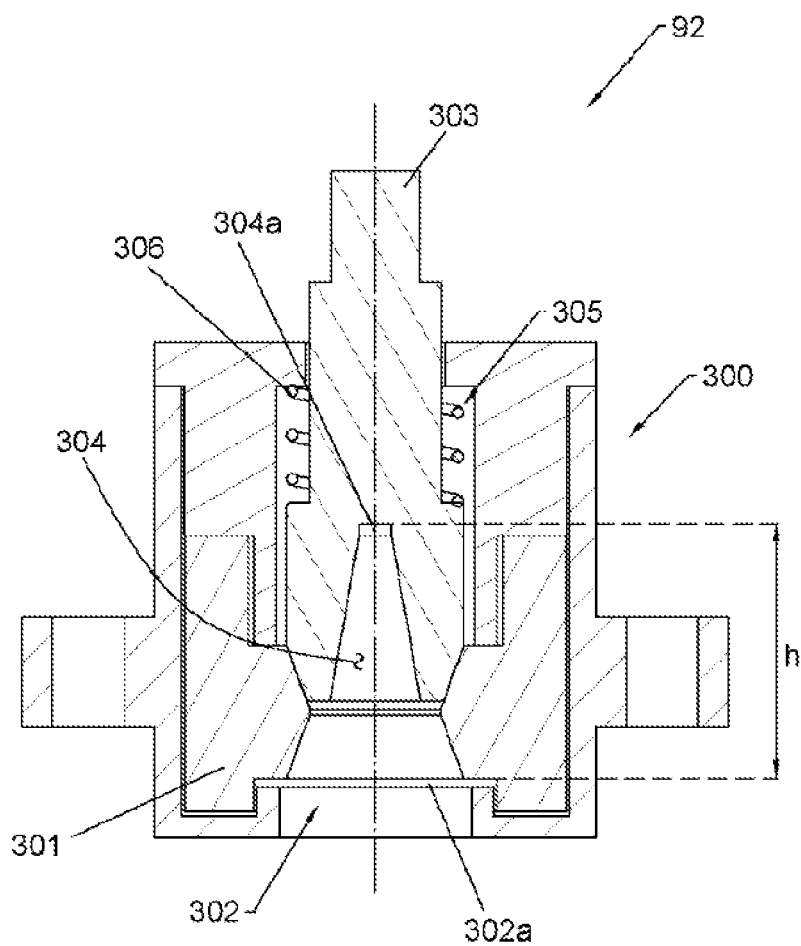
FIG. 9 shows a sectional view of a female connector according to the application in a first operating position.
Figure 10:
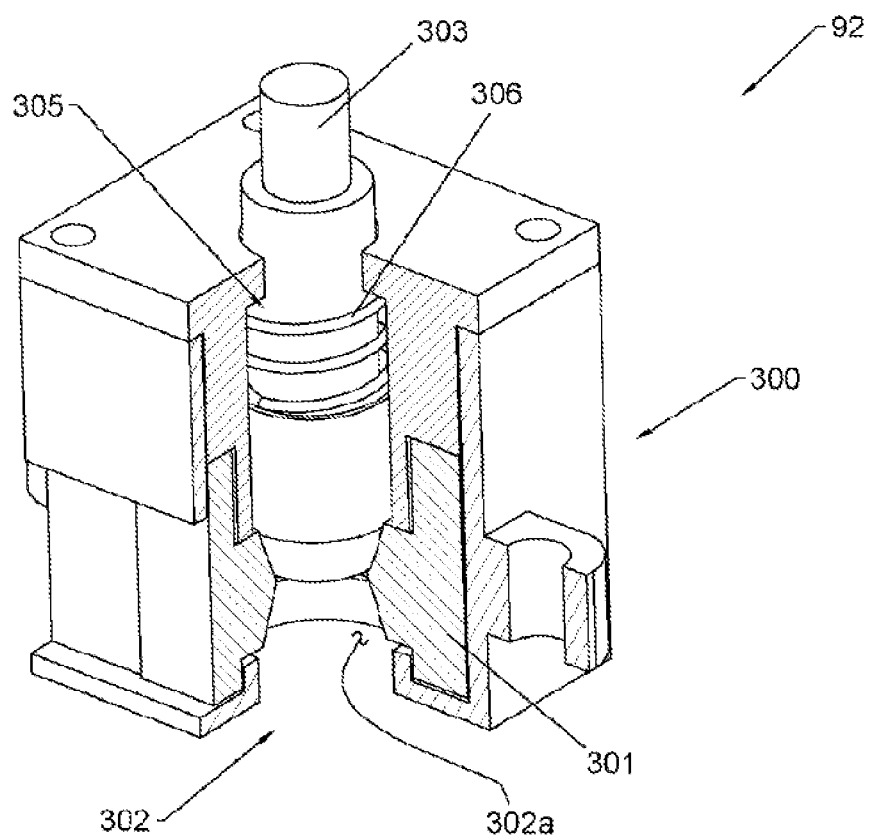
FIG. 10 shows a split axonometric view of the female connector in FIG. 9.
Figure 11:
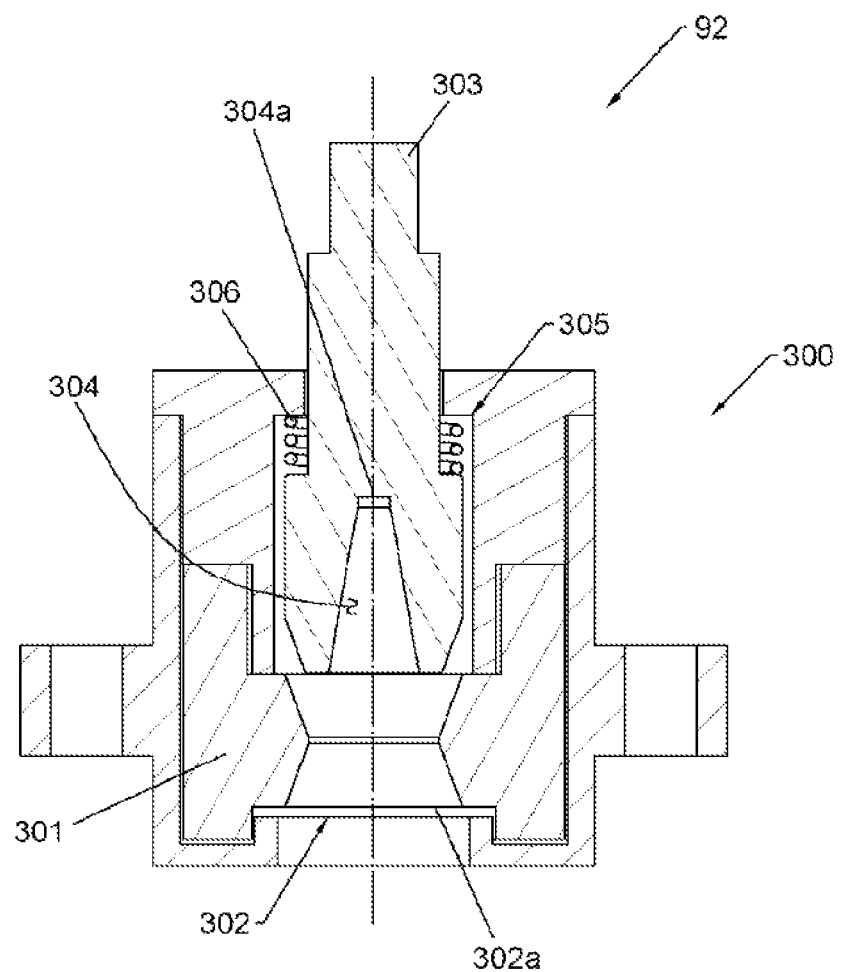
FIG. 11 shows a section of the female connector according to the application in a second operating position.
Figure 12:
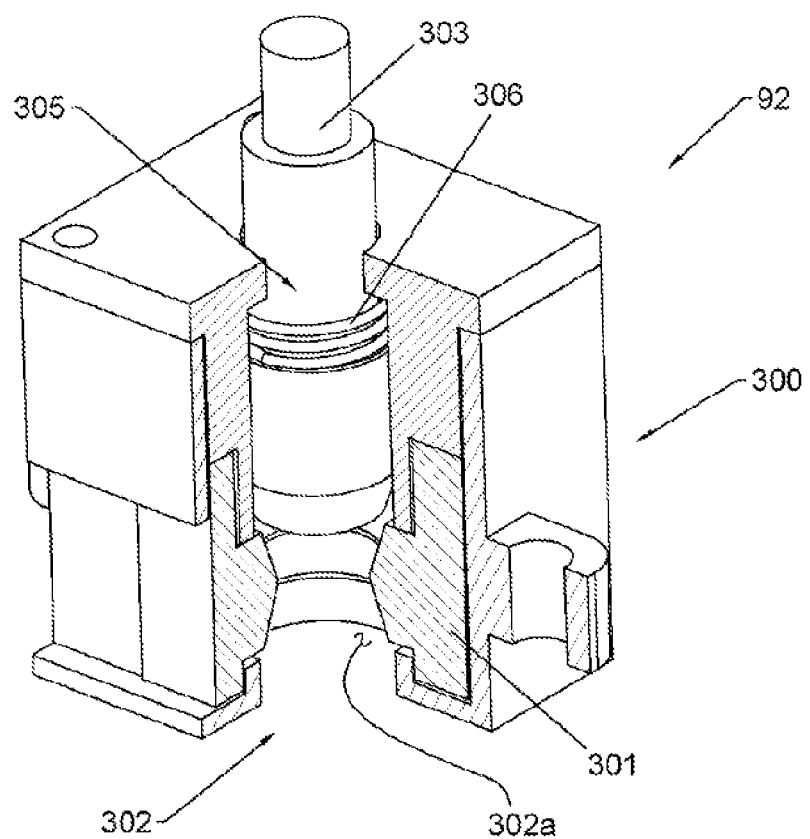
FIG. 12 shows a split axonometric view of the female connector in FIG. 11.

In this respect, with regard to the first electrical power connection means 92, as can be seen in FIGS. 9, 10, 11 and 12, they comprise a female connector 300 provided with a first conductor element 301 in which a through hole 302 is made, having an inlet mouth 302a facing outwards with respect to the outer casing 11 of the relative module 10. Furthermore, they comprise a second conductor element 303 arranged on the opposite side of the first conductor element 301 with respect to the aforesaid inlet mouth 302a. In turn, such second conductor element 303 has a through hole 304 defined coaxially to the through hole 302 of the first conductor element 301. Furthermore, the second conductor element 303 is configured to move in relation to the first conductor element 301 along a direction parallel to the direction of development of the aforesaid two through holes 302 and 304 from a first operating position, according to which the second conductor element 303 is in contact with the first conductor element 301, as shown in FIG. 9 and in FIG. 10, to a second operating position, according to which the second conductor element 303 is spaced apart and electrically isolated from the first conductor element 301, as shown in FIG. 11 and in FIG. 12, and vice versa.

According to the preferred embodiment of the application, the female connector 300, in a rest state, is kept in the aforesaid first operating position by means of an elastic thrust element 305, in particular a thrust spring 306, which acts on the second conductor element 303 in the direction exiting the casing 3.

The through holes 302 and 304 of the first conductor element 301 and of the second conductor element 303 are shaped so as to allow the passage of the free end 203a of the second conductor element 203 of the male connector 200 and so that, at the first operating position of the female connector 300, the overall height h of the two through holes 302 and 304 is less than the height H of the free end 203a of the second conductor element 203 of the male connector 200.

Figure 15:
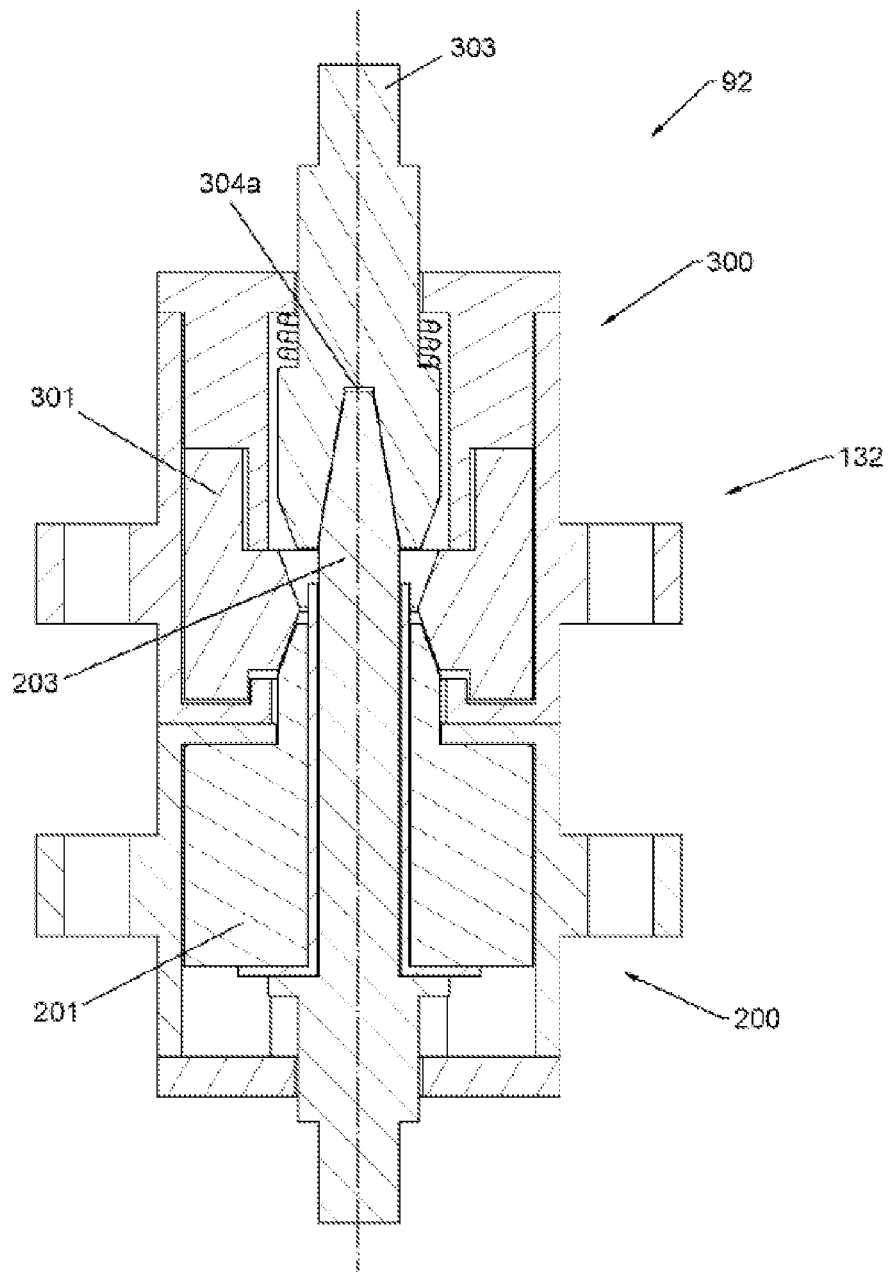
FIG. 15 shows a sectional view of the coupling of the male connector in FIG. 13 and the female connector in FIGS. 9 and 10 according to the application.
Figure 16:
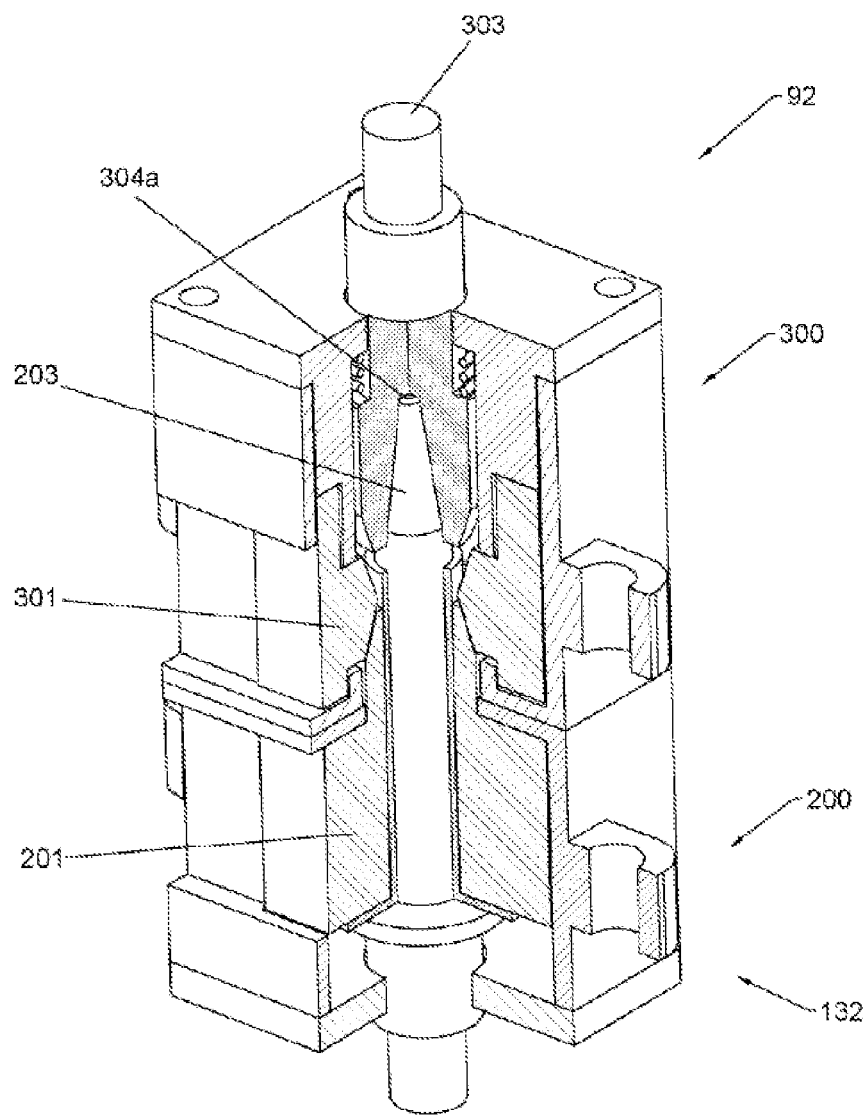
FIG. 16 shows a split axonometric view of the coupling of the male connector to the female connector in FIG. 15.

Advantageously, in such way, as can be seen in FIG. 15 and in FIG. 16, when the male connector 200 comprising the second conductor element 203 is connected to the female connector 300, the same second conductor element 203 of the male connector 200 comes into contact with the bottom 304a of the through hole 304 of the second conductor element 303 of the female connector 300, determining the translation of the female connector 300 from the first operating position to the second operating position.

In this way, a state of electrical contact is defined between the first conductor elements 201 and 301 of the male connector 200 and of the female connector 300 and a state of electrical contact between the second conductor elements 203 and 303 of the male connector 200 and of the female connector 300 and a state of galvanic isolation is also defined between the first conductor elements 201 and 301 and the second conductor elements 203 and 303.

Therefore, when the main module 2 is coupled to the auxiliary module 10, and thus, the first electrical power connection means 92 are coupled to the second electrical power connection means 132, an electrical outward path (flow) of the electrical power is defined from the main module 2 to the auxiliary module 10 and an electrical return path (flow) of the adapted electrical power is defined from the auxiliary module 10 to the main module 2.

Figure 19:
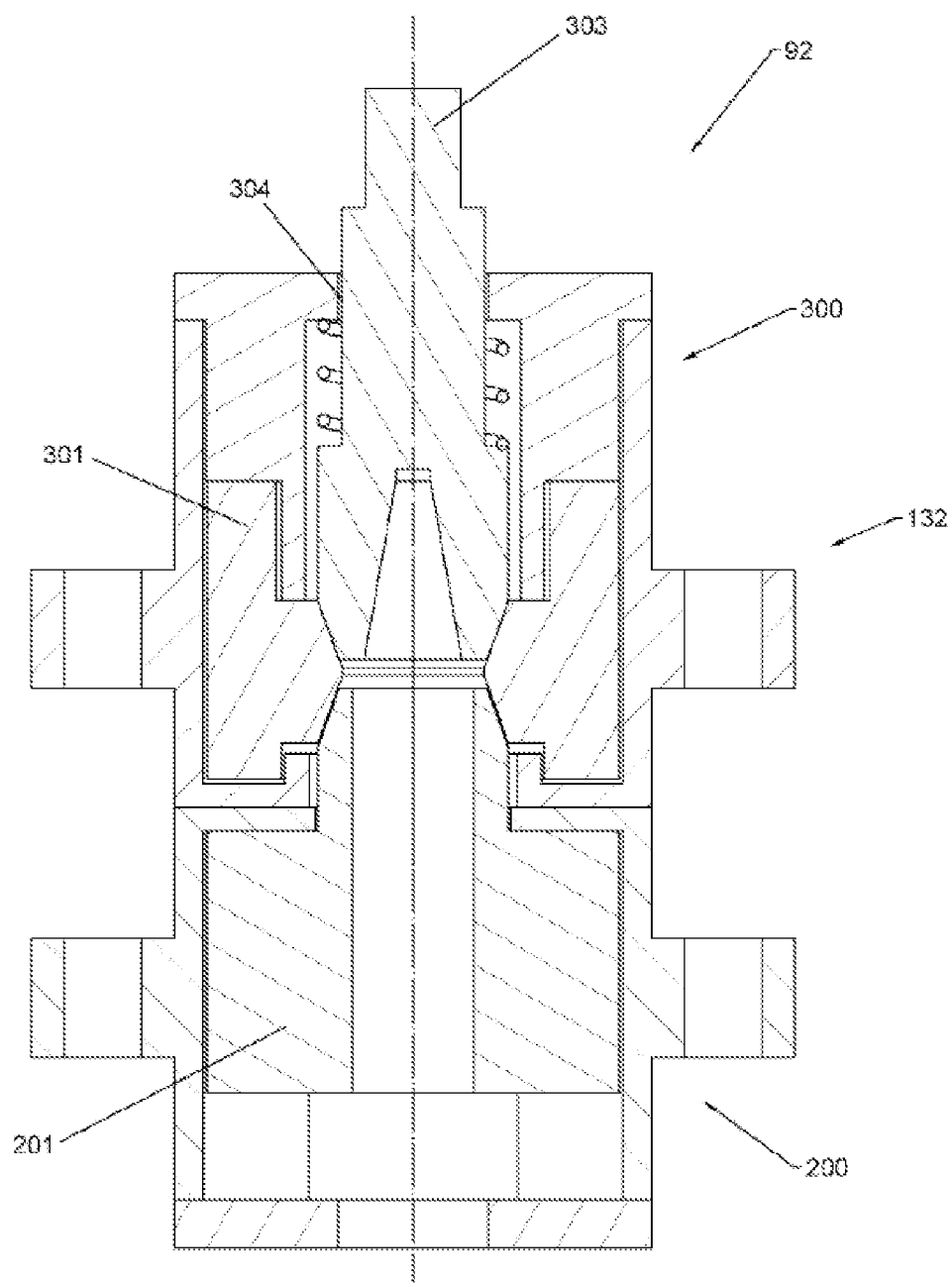
FIG. 19 shows a sectional view of the coupling of the male connector in FIG. 17 and the female connector in FIGS. 9 and 10 according to the application.
Figure 20:
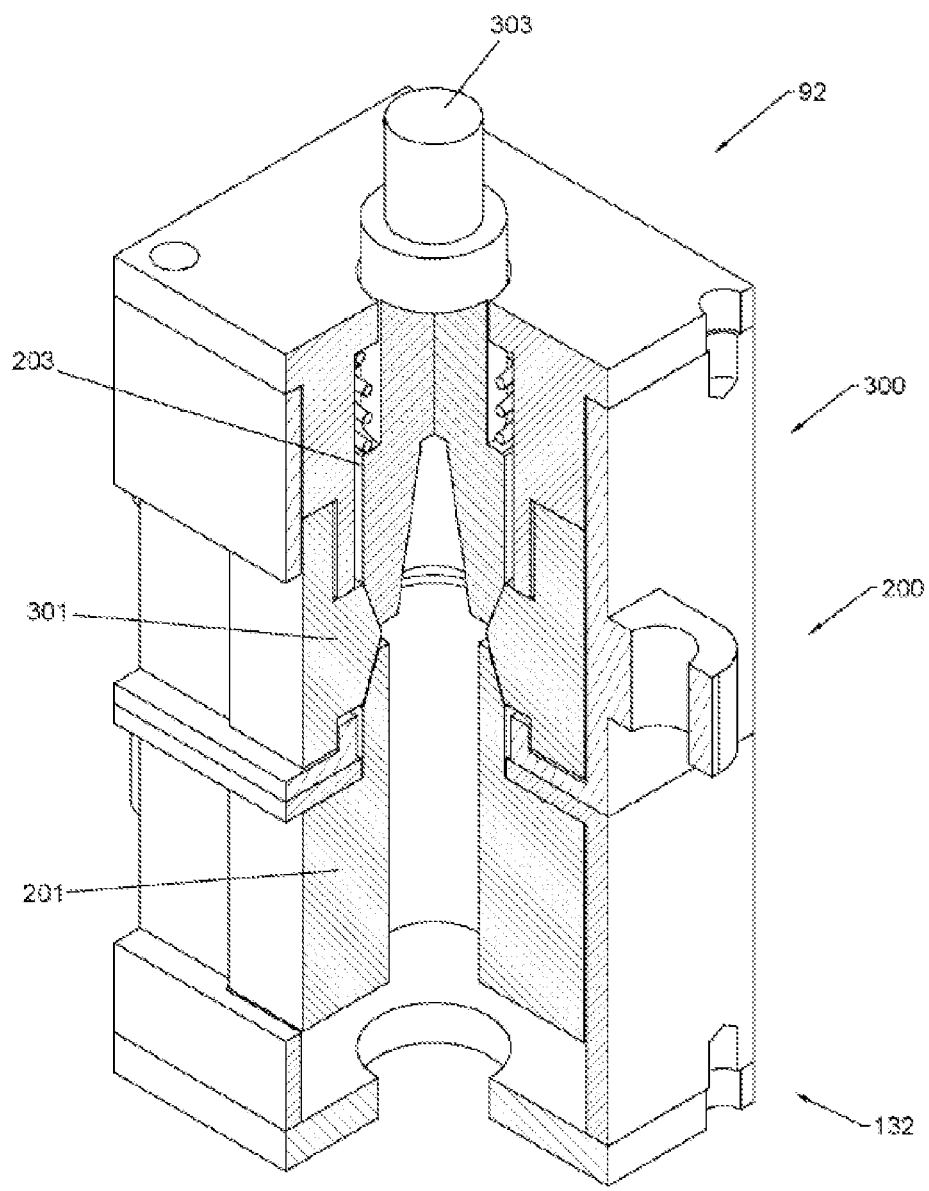
FIG. 20 shows a split axonometric view of the coupling of the male connector to the female connector in FIG. 19.

Alternatively, if the male connector 200 is devoid of the second conductor element 203, as shown in FIGS. 19 and 20, when the same male connector 200 is connected to the female connector 300, the first operating position of the latter remains unaltered, thus, maintaining the electrical contact between the second conductor element 303 and the first conductor element 301, and, at the same time, the electrical contact between the first conductor elements 201 and 301 is further established. Therefore, the coupling of the male connector 200, devoid of the second conductor element 203, to the female connector 300 allows a monodirectional electrical connection to be defined between the main module 2 and the auxiliary module 10.

In short, it is understood that the structures of the male connector 200 and the female connector 300 of the application advantageously allow a dual operational functionality to be obtained, easily providing the same male connector with, or depriving the same male connector of a single element corresponding to the aforesaid second conductor element 203.

As an alternative to the preferred embodiment, the application doesn't exclude that the first electrical power connection means 92 comprise the male connector 200 and the second electrical power connection means 132 comprise the female connector 300. Again, it is not excluded that, in different embodiments to the preferred one described above, the first electrical power connection means 92 and the second electrical power connection means 132 comprise more than one female connector 300 and more than one male connector 200 respectively.

In particular, according to a preferred embodiment of the application, the second electrical power connection means 132 could comprise two male connectors 200 and the first electrical power connection means 92 could comprise two female connectors 300, so as to make an outward and return electrical connection for both polarities of the electrical power exchanged between the main module 2 and the auxiliary module 10, clearly when both of the two male connectors 200 are also provided with the second conductor element 203.

Moreover, it is not excluded that, according to alternative embodiments with respect to the first preferred embodiment of the welding system 1 of the application, the aforesaid first and second electrical power connection means 92 and 132 are structured differently from what was stated above, provided that they are capable of establishing the aforesaid electrical connection between the main module 2 and the auxiliary module 10. Furthermore, incidentally, it is important to highlight that the particular solution and configuration of the first electrical power connection means 92 and the second electrical power connection means 132, described above, could be the subject of the claim in itself, without having to apply them to the main module 2 and auxiliary module 10 of the welding system 1 which is the subject of the application. In other words, the particular configuration of the first and second electrical power connection means 92 and 132 could advantageously allow, in itself, an electrical connection to be established in a quick, reversible and reliable manner in multiple sectors and applications requiring the electrical connection of two electrical/electronic devices.

As regards the welding system 100 according to the second preferred embodiment of the application, shown in FIGS. from 5 to 8, it should be stated that, for the sake of simplicity, where not otherwise specified, it comprises all of the features described in detail for the first preferred embodiment, particularly with regard to the structure of the mechanical and electrical connection unit of the first type 9 and the mechanical and electrical connection unit of the second type 13.

In addition to the main module 2 having the same characteristics described for the first preferred embodiment, such second preferred embodiment comprises two auxiliary modules 20 and 30, each of which is provided with an outer casing 21 and 31 identifying an electric generator 22 and 32 configured to adapt the electrical characteristics of an electrical power received on input to a specific type of welding, different from the main module 2 and from the remaining auxiliary module.

According to the application, a first auxiliary module 20 of the two auxiliary modules 20 and 30 comprises a mechanical and electrical connection unit of the first type 9 and also a mechanical and electrical connection unit of the second type 13, while the second auxiliary module 30 of the two auxiliary modules 20 and 30 comprises at least a mechanical and electrical connection unit of the second type 13 couplable to the mechanical and electrical connection unit of the first type 9 of the first auxiliary module 20 or, alternatively, to the mechanical and electrical connection unit of the first type 9 of the main module 2. Advantageously, this allows a mechanical coupling of the reversible type to be obtained, and a power connection and a data connection to be established between the main module 2 and the first auxiliary module 20 and, at the same time, between the first auxiliary module 20 and the second auxiliary module 30.

Figure 7:
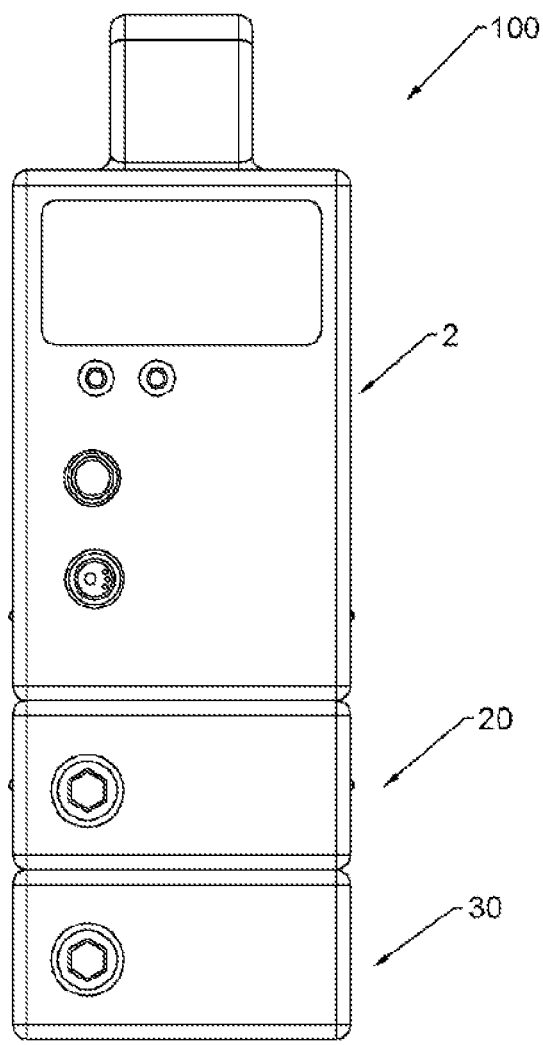
FIG. 7 shows a front view of the second preferred embodiment of the welding system in FIG. 5 in a coupling configuration.
Figure 8:
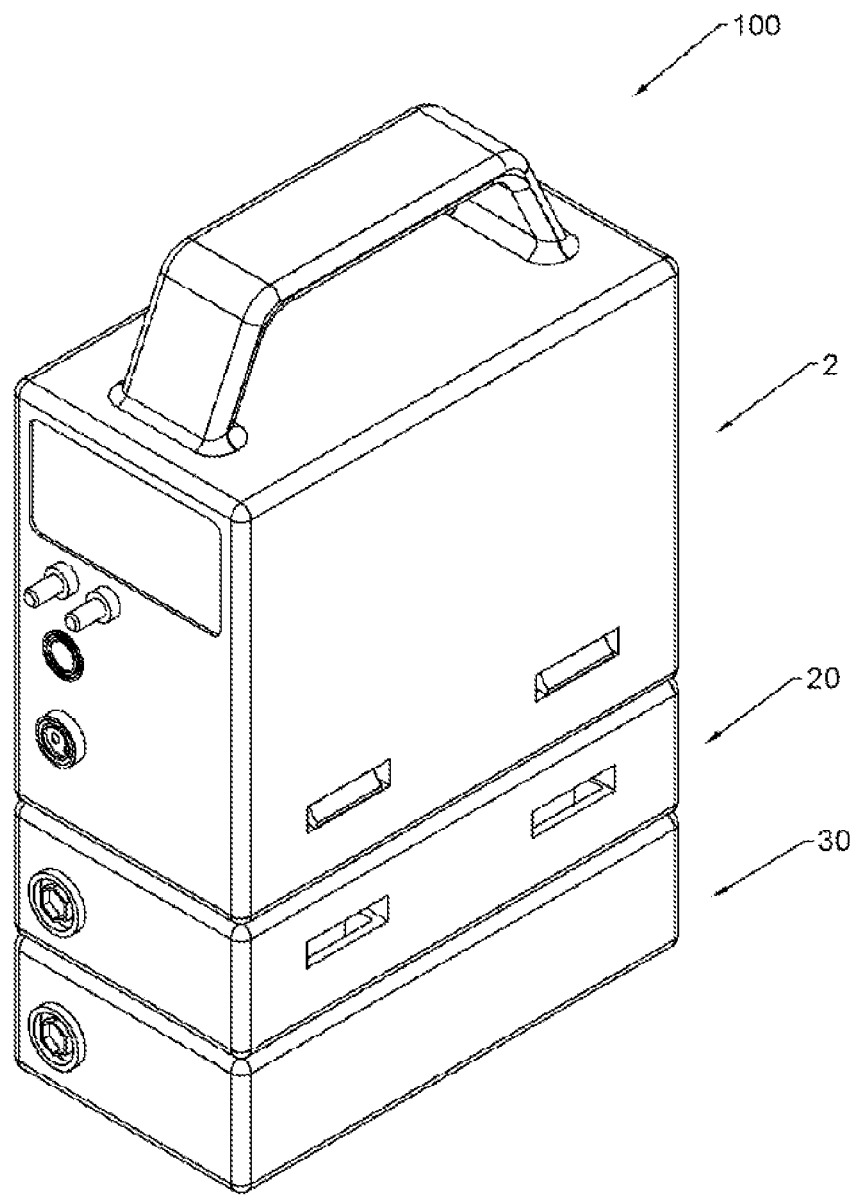
FIG. 8 shows an axonometric view of the second preferred embodiment of the welding system in FIG. 5 in a coupling configuration.

Such power connections are configured to allow at least the flow of an electrical power between the main module 2 and the first auxiliary module 20 and between the first auxiliary module 20 and the second auxiliary module 30 respectively, as shown in FIGS. 7 and 8.

Preferably, when the two auxiliary modules 20 and 30 are mechanically and electrically coupled, directly or indirectly, to the main module 2, the welding system 100 is also configured to transmit, by means of the aforesaid electrical power connection, the adapted electrical power from both or from only one of the electric generators 22 and 32 of the aforesaid two auxiliary modules 20 and 30 to the main module 2, in order to supply such adapted electrical power on the output port 6.

Advantageously, in this way, for any type of welding, it is possible to take advantage of the output 6 defined in the main module 2 to connect and use the torch specifically adapted to implement the type of welding for which the two auxiliary modules 20 and 30 are configured, thus, without having to provide the latter with a further output port. Alternatively, the welding system 100 of the application allows the main module 2 and the second auxiliary module 30 to be coupled mechanically in a reversible manner, thus excluding the first auxiliary module 20, and thus, allowing a power connection and a data connection to be established between the same main module 2 and the second auxiliary module 30.

Such power connection is thus configured to allow at least the flow of an electrical power between the main module 2 and the second auxiliary module 30.

Advantageously, the welding system 100, relating to the second preferred embodiment of the application, allows at least four different operating modes to be defined. In detail, alternatively, it is possible, with the welding system 100, to implement the type or types of welding for which the single main module 2 is configured, the type or types of welding implementable by means of combining the main module 2 with the first auxiliary module 20, the type or types of welding implementable by combining the main module 2 with the first auxiliary module 20 and the second auxiliary module 30, and finally, the type or types of welding implementable by combining the main module 2 only with the second auxiliary module 30.

Further variations of the welding system 100 of the application could comprise more than two auxiliary modules, each of which can comprise a mechanical and electrical connection unit of the first type 9 and/or a mechanical and electrical connection unit of the second type 13, where the various auxiliary modules are configured to implement different welding modes with respect to each other and to the main module.

Such alternative embodiments of the welding system of the application allow one or more auxiliary modules to be coupled, combined or as an alternative, to the main module so as to adapt the welding system of the application to a particular type of welding selected from a variety of welding types provided.

Based on the above, it is clear that the welding system, which is the subject of the application, achieves the pre-set objects.

In particular, the object of producing a welding system of the modular type is achieved, which is capable of being adapted to implement a specific welding process selected from those stated above.

Furthermore, the object of producing a welding system of the modular type is achieved, which can be adapted to a specific welding process quickly and reversibly, without needing to intervene internally on the system components and on the wiring connecting such components.

Another object, which is achieved is that of producing a modular welding system, which can be adapted quickly to a specific welding process and, at the same time, which is cheaper than requiring a specific welding device of the prior art for each type of welding. Finally, the object of producing a modular welding system is also achieved, which allows the subsequent integration, at a reduced cost, of a further type of welding with respect to those already available.

The invention claimed is:

1. A welding system, comprising:
    a main module provided with an outer casing;
        said outer casing having an input port for a connection to a source of external electrical power;
        an electric generator housed within said outer casing and configured to adapt electrical characteristics of an electrical power received on input to a first type of welding;
        said outer casing having at least an output port for a connection, by an electrical conductor, to a welding torch, and wherein an adapted electrical power is supplied to said output port;
        an electronic control unit housed within said outer casing and configured to control functionality of said electric generator;
    said main module comprising, on said outer casing, a mechanical and electrical connection unit of a first type,
    said welding system further comprising at least an auxiliary module—provided with an outer casing housing:
    an electric generator configured to adapt the electrical characteristics of an electrical power received on input to a second type of welding;
    at least a mechanical and electrical connection unit of a second type couplable to said mechanical and electrical connection unit of a first type of said main module to allow the mechanical coupling of a reversible type to said main module and to establish an electrical power connection and a data connection between said main module and said auxiliary module, said electrical power connection being configured to allow at least a flow of an electrical power from said main module to said auxiliary module,
    wherein the welding system is configured, when said main module is mechanically and electrically coupled to said auxiliary module, to:
        transmit, by said electrical power connection, the power received on input on said input port or the electric power adapted by said electric generator of said main module from said main module to said auxiliary module;
        transmit, by said electric power connection, the electrical power adapted by said electric generator of said auxiliary module to said output port of said main module,
    said mechanical and electrical connection unit of said first type comprises:
        first mechanical connection means;
        at least first electrical power connection means;
        at least first data connection means;
    said mechanical and electrical connection unit of said second type comprises:
        second mechanical connection means couplable to said first mechanical connection means;
        at least second electrical power connection means couplable to said first electrical power connection means;
        at least second data connection means couplable to said first data connection means;
    wherein said first and second electrical power connection means and said first and second data connection means being coupled to each other respectively when said auxiliary module is mechanically coupled to said main module by means of said first mechanical connection means and said second mechanical connection means,
wherein said first electrical power connection means comprise at least a female connector provided with:
a first conductor element in which a through hole is made, having an inlet mouth facing outwards with respect to said outer casing;
a second conductor element arranged on the opposite side of said first conductor element with respect to said inlet mouth said second conductor element having a though hole, defined coaxially to said through hole of said first conductor element, said second conductor element being configured to move in relation to said first conductor element along a direction parallel to the direction of development of said holes from a first operating position, according to which said second conductor element is in contact with said first conductor element, to a second operating position, according to which said second conductor element is spaced apart and electrically isolated from said first conductor element and vice versa,
wherein said second electrical power connection means comprise at least a male connector provided with:
a first conductor element, in which a through hole is made according to the direction, exiting said outer casing;
a second conductor element with a substantially longitudinal development inserted passing through said through hole, said second conductor element having the free end thereof protruding outwards with respect to said through hole for a predetermined height;
an electrically isolated tubular element arranged between said first conductor element and said second conductor element so that said first conductor element and said second conductor element are electrically isolated from each other;
wherein said through holes of said first conductor element and of said second conductor element are shaped so as to allow the passage of the free end of said second conductor element of said male connector and so that, at said first operating position, the overall height of said through holes is less than said height of said free end of said second conductor element of said male connector,
wherein, when said male connector is connected to said female connector, said second conductor element of said male connector comes into contact with the bottom of said through hole of said second conductor element of said female connector, determining the translation of said female connector from said first operating position to said second operating position and determining a state of electrical contact between said first conductor elements of said male connector and of said female connector and between said second conductor elements of said male connector and of said female connector respectively, and a state of electrical isolation between said first conductor elements and said second conductor elements,
or alternatively, said male connector is provided with:
a first conductor element, in which a through hole is made according to the direction, exiting said outer casing; and said male connector being devoid of said second conductor element; wherein when said male connector is connected to said female connector, said first operating position of said female connector remains unaltered, thus, maintaining the electrical contact between said second conductor element and said first conductor element, and, at the same time, the electrical contact between said first conductor elements is established;
wherein the main module is coupled to the auxiliary module, and thus, the first electrical power connection means are coupled to the second electrical power connection means, an electrical outward path flow of the electrical power is defined from the main module to the auxiliary module and an electrical return path flow of the adapted electrical power is defined from the auxiliary module to the main module; and the coupling of the male connector, devoid of the second conductor element, to the female connector allows a monodirectional electrical connection to be defined between the main module and the auxiliary module.

2. The welding system according to claim 1, wherein, when said main module is mechanically and electrically coupled to said auxiliary module, said electronic control unit of said main module is configured to control the functionality of said electric generator of said auxiliary module by means of said data connection.

3. The welding system according to claim 1, wherein said welding system comprises at least two auxiliary modules, each provided with an outer casing housing an electric generator configured to adapt, to a type of welding different from said main module and from said remaining auxiliary module, the electrical characteristics of an electrical power received on input, wherein at least a first auxiliary module of said two auxiliary modules comprises a mechanical and electrical connection unit of said first type and a mechanical and electrical connection unit of said second type and the second auxiliary module of said two auxiliary modules comprises at least a mechanical and electrical connection unit of said second type couplable to said mechanical and electrical connection unit of said first type of said first auxiliary module to allow the mechanical coupling of the reversible type and to establish an electrical power connection and a data connection between said main module and said first auxiliary module and, at the same time, between said first auxiliary module and said second auxiliary module, said electrical power connections being configured to allow at least the flow of an electrical power from said main module to said first auxiliary module and from said first auxiliary module to said second auxiliary module respectively;
wherein the welding system is configured, when said main module is mechanically and electrically coupled to said two auxiliary modules, to:
transmit, by said electrical power connection, the power received on input on said input port or the electrical power adapted by said electric generator of said main module from said main module to said two auxiliary modules;
transmit, by said electrical power connection, the electrical power adapted by said electric generators of said two auxiliary modules to said output port of said main module.

4. The welding system according to claim 2, said welding system comprising at least two auxiliary modules, each provided with an outer casing identifying an electric generator configured to adapt, to a type of welding different from said main module and from said remaining auxiliary module, the electrical characteristics of an electrical power received on input, wherein at least a first auxiliary module of said two auxiliary modules comprises a mechanical and electrical connection unit of said first type and a mechanical and electrical connection unit of said second type and the second auxiliary module of said two auxiliary modules comprises at least a mechanical and electrical connection unit of said second type couplable to said mechanical and electrical connection unit of said first type of said first auxiliary module to allow the mechanical coupling of the reversible type and to establish an electrical power connection and a data connection between said main module and said first auxiliary module and, at the same time, between said first auxiliary module and said second auxiliary module, said electrical power connections being configured to allow at least the flow of an electrical power from said main module to said first auxiliary module and from said first auxiliary module to said second auxiliary module respectively;

wherein the welding system is configured, when said main module is mechanically and electrically coupled to said two auxiliary modules, to:

transmit, by said electrical power connection, the power received on input on said input port or the electrical power adapted by said electric generator of said main module from said main module to said two auxiliary modules;

transmit, by said electrical power connection, the electrical power adapted by said electric generators of said two auxiliary modules to said output port of said main module.

\* \* \* \* \*